UNITED STATES PATENT OFFICE 2,514,200

VULCANIZATION OF RUBBERS BY MEANS OF 2,5-DI-SUBSTITUTED TETRAHYDRO-1,2,5-THIADIAZINES

James A. Shotton, Cedar Rapids, Iowa, and Robert A. Donia, Houghton, Mich., assignors to The Firestone Tire & Rubber Company, Akron, Ohio, a corporation of Ohio No Drawing. Application March 30, 1949, Serial No. 84,494

13 Claims. (Cl. 260—79.5)

This invention relates to the use of 2,5-di-substituted tetrahydro-1,2,5-thiadiazine-6-thiones as curing agents in rubbery materials. It includes the process of curing as well as the resulting vulcanizates.

The curing agents are obtained by oxidation of N'-substituted (beta-aminoethyl) N-substituted dithiocarbamic acids, as indicated in the following equation:

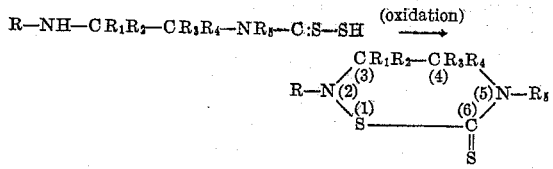

The R's stand for aliphatic groups of one to twenty carbon atoms, such as methyl, ethyl, propyl, octyl, dodecyl, octadecyl (straight chain and branched chain), etc. including unsaturated aliphatic groups such as allyl, methallyl, octadecenyl, etc., cyclo-substituted groups, such as benzyl, furfuryl, tetrahydrofurfuryl, etc., and cycloaliphatic groups such as cyclopentyl, cyclohexyl, etc., and may also stand for terpenyl groups such as, for example, bornyl, isobornyl, etc. Generally the 3- and 4-positions are unsubstituted, i. e., $R_1$, $R_2$, $R_3$ and $R_4$ are hydrogen, but the reaction proceeds in the same manner when these positions are substituted. The R's may stand for the same or different alkyl substituents.

The following example illustrates the method of preparing these compounds.

Example

N,N'-diethylethylenediamine is obtainable by reacting an excess of two moles of ethylamine with one mole of ethylene dichloride in a bomb, alkalizing the product with aqueous NaOH to free the amine from its hydrochloride, separating the sodium hydroxide solution, and distilling. N,N'-diethylethylenediamine boils at 65.5° C. at 35 mm.

N'-beta-ethylamino-ethyl-N-ethyl dithiocarbamic acid was obtained by adding dropwise to a solution of one mole of N,N'-diethylethylenediamine in acetone, a slight excess of one mole of carbon disulfide in acetone. The solution was cooled to prevent the temperature rising above 15° C. The acid precipitated, and was washed with acetone and ether.

One hundred and ninety-two grams (1 mole) N-beta-ethylamino-ethyl-N-ethyl dithiocarbamic acid were dissolved in 500 cc. of water containing 50 grams of sodium hydroxide and then diluted to a liter. To this was added, through a dropping funnel, 254 grams of iodine (1 mole) and 275 grams of potassium iodide dissolved in 1 liter of water. The drops came just rapidly enough so that a continuous stream was broken. The alkaline solution was stirred vigorously with an electric stirrer as the iodine solution was added. The oxidized product was precipitated as it was formed. This was filtered off after reaction was completed. The precipitate was washed on the filter to remove any alkali and then dried. The dried precipitate was treated with ether to dissolve the compound, namely, 2,5-diethyltetrahydro-1,2,5-thiadiazine-6-thione. The compound was recrystallized after evaporation of the ether. The properties of the compound are given in the following table.

The N-cyclohexyl-N'-beta-cyclohexylaminoethyl dithiocarbamic acid and N-isopropyl-N'-beta-isopropylaminoethyl dithiocarbamic acid were oxidized in the same manner using the same molar proportions of alkali and iodine. 2,5-dicyclohexyltetrahydro-1,2,5-thiadiazine-6-thione and 2,5-diisopropyltetrahydro-1,2,5-thiadiazine-6-thione were recovered and crystallized in the same manner.

The properties of the above three compounds are recorded in the following table in which the compounds are identified by reference to the 2,5-dialkyl substituent. The melting points are corrected. The molecular weights were determined by the cryoscopic method in benzene.

*Properties of 2,5-dialkyl tetrahydro-1,2,5-thiadiazine-6-thiones*

| Thione | Melting Point | Molecular Weight | | Analyses | | | |
|---|---|---|---|---|---|---|---|
| | | | | Calculated | | Found | |
| | | Calc. | Found | Percent N | Percent S | Percent N | Percent S |
| | °C. | | | | | | |
| diethyl | 62.0– 62.5 | 190.3 | 197 | 14.71 | 33.69 | 14.9 | 33.9 |
| diisopropyl | 104.8–105.0 | 218.4 | 214 | 12.82 | 29.32 | 13.2 | 29.6 |
| dicyclohexyl | 138.8–139.6 | 298.5 | 299 | 9.41 | 21.48 | 9.8 | 21.7 |

This class of materials may be employed for the curing of natural rubber and the various curable rubbery synthetics, including, for example, Butyl rubber, polybutadiene, copolymers of a conjugated-diene monomer and a vinyl monomer, such as butadiene-styrene, butadiene-acrylonitrile copolymers, etc., polyisoprene, etc. This is illustrated by the following experiments. The data show that a cure is effected.

The effect on the rubbery copolymer of 1,3-butadiene and styrene known as GR-S is illustrative of the effect on other rubbery materials, as, for example, other copolymers of a conjugated-diene monomer and a vinyl monomer. The conjugated-diene monomers which may be used include, for example, 1,3-butadiene, isoprene, 2-cyanobutadiene-1,3, cyclopentadiene, piperylene, dimethylbutadiene - 1,3, 2 - methylpentadiene-1,3, etc. The vinyl monomers which may be used include both aromatic and aliphatic vinyl compounds such as, for example, styrene, alpha methyl styrene, vinylnaphthalenes, vinylbiphenyl, vinylcarbazole, 2-vinyl-5-ethylpyridine, 2-ethyl-5-vinylpyridine, acrylonitrile, chloracrylonitrile, methacrylonitrile, acrylamide, esters of acrylic acid containing one to five carbon atoms in the ester group, for example, etc.

The curing agent may be used with or without accelerators, although, as illustrated in the following examples, accelerators will ordinarily be employed to speed up the cure.

In the first of the recorded tests the GR-S copolymer was compounded according to the following formula and the product after heating for 10, 20, 40 and 80 minutes at 290° F. was found to have the properties recorded in Table I. Both compositions contained a small amount of commercial accelerator. The control contained free sulfur, but the test material contained no free sulfur. (In both Tables I and II the modulus and tensile strength are recorded in pounds per square inch and the elongation in percentages; and the ingredients are measured in parts by weight.)

*Formula*

|  | Control | Test #1 |
|---|---|---|
| GR-S Copolymer | 100.00 | 100.00 |
| Stearic acid | 2.50 | 2.50 |
| Coal tar oil | 4.00 | 4.00 |
| Petroleum asphalt | 2.60 | 2.60 |
| Zinc oxide | 2.40 | 2.40 |
| Carbon Black | 45.00 | 45.00 |
| Accelerator | 1.80 | 1.50 |
| Free sulfur | 1.70 | |
| 2,5 - Diethyltetrahydro - 1,2,5 - thiadiazine - 6 - thione | | 8.00 |

*Table I*

|  | Control | Test #1 |
|---|---|---|
| Modulus at 300%: | | |
| 10 min. at 298° F | 100 | 125 |
| 20 min. at 298° F | 325 | 175 |
| 40 min. at 298° F | 725 | 250 |
| 80 min. at 298° F | 900 | 250 |
| Modulus at 400%: | | |
| 10 min. at 298° F | 100 | 200 |
| 20 min. at 298° F | 600 | 300 |
| 40 min. at 298° F | 1,275 | 400 |
| 80 min. at 298° F | 1,450 | 450 |
| Tensile Strength: | | |
| 10 min. at 298° F | 100 | 925 |
| 20 min. at 298° F | 2,450 | 1,800 |
| 40 min. at 298° F | 2,950 | 2,150 |
| 80 min. at 298° F | 3,100 | 2,200 |
| Elongation: | | |
| 10 min. at 298° F | 950 | 1,010 |
| 20 min. at 298° F | 830 | 970 |
| 40 min. at 298° F | 650 | 890 |
| 80 min. at 298° F | 620 | 910 |

The results clearly show that the thiones of the class defined are curing agents. The properties of the products may vary by the use of different accelerators, etc. Products suitable for different purposes can be obtained by proper compounding.

GR-S was further compounded for testing, using the same formula as for Test #1, except that for Test #2 15.9 parts of 2,5-dicyclohexyltetrahydro-1,2,5-thiadiazine-6-thione was used and for Test #3 11.6 parts of 2,5-diisopropyltetrahydro-1,2,5-thiadiazine-6-thione was used. The different materials were cured 20, 40, 80 and 160 minutes at 280° F. and on testing against a control compounded as in the formula, were found to have the properties recorded below.

*Table II*

|  | Control | Test #2 | Test #3 |
|---|---|---|---|
| Modulus at 300%: | | | |
| 20 min. at 280° F | 25 | 625 | 1,000 |
| 40 min. at 280° F | 500 | 1,100 | 1,450 |
| 80 min. at 280° F | 1,225 | 1,325 | 1,575 |
| 160 min. at 280° F | 1,400 | 1,425 | 1,600 |
| Tensile strength: | | | |
| 20 min. at 280° F | 25 | 2,550 | 2,975 |
| 40 min. at 280° F | 2,450 | 3,200 | 2,650 |
| 80 min. at 280° F | 3,150 | 3,325 | 2,550 |
| 160 min. at 280° F | 2,800 | 3,125 | 2,625 |
| Elongation: | | | |
| 20 min. at 280° F | 700 | 690 | 570 |
| 40 min. at 280° F | 720 | 590 | 420 |
| 80 min. at 280° F | 520 | 520 | 390 |
| 160 min. at 280° F | 430 | 490 | 410 |

These results likewise show the curing effect of this class of compounds.

What we claim is:

1. The method of vulcanizing an uncured rubbery material of the class consisting of natural rubber and rubbery synthetic conjugated-diene polymers, which comprises heating the same with a compound of the formula

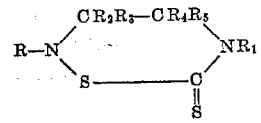

in which R and R₁ contain one to twenty carbon atoms and are from the class consisting of alkyl, alkenyl, cycloalkyl, benzyl, furfuryl, tetrahydrofurfuryl and terpenyl groups; and $R_2$, $R_3$, $R_4$ and $R_5$ are from the class consisting of hydrogen, alkyl, alkenyl, cycloalkyl, benzyl, furfuryl, tetrahydrofurfuryl and terpenyl groups, said groups containing no more than twenty carbon atoms.

2. The method of vulcanizing a vulcanizable rubbery material of the class consisting of natural rubber and rubbery synthetic conjugated-diene polymers, which comprises heating the same with 2,5-dialkyltetrahydro-1,2,5-thiadiazine-6-thione in which the alkyl groups each contain one to twenty carbon atoms.

3. The method of vulcanizing a vulcanizable rubbery material of the class consisting of natural rubber and rubbery synthetic conjugated-diene polymers, which comprises heating the same with 2,5-diethyltetrahydro-1,2,5-thiadiazine-6-thione.

4. The method of vulcanizing a vulcanizable rubbery material of the class consisting of natural rubber and rubbery synthetic conjugated-diene polymers, which comprises heating the same with 2,5-diisopropyltetrahydro-1,2,5-thiadiazine-6-thione.

5. The method of vulcanizing a vulcanizable rubbery material of the class consisting of natural rubber and rubbery synthetic conjugated-diene polymers, which comprises heating the same with 2,5-dicyclohexyltetrahydro-1,2,5-thiadiazine-6-thione.

6. The method of vulcanizing natural rubber which comprises heating the same with a 2,5-dialkyltetrahydro-1,2,5-thiadiazine-6-thione in which the alkyl groups each contain one to twenty carbon atoms.

7. The method of vulcanizing rubbery copolymer of styrene and 1,3-butadiene which comprises heating the same with 2,5-dialkyltetrahydro-1,2,5-thiadiazine-6-thione in which the alkyl groups each contain one to twenty carbon atoms.

8. The method of vulcanizing rubbery copolymer of conjugated-diene monomer and mono-unsaturated vinyl monomer which comprises heating the same with 2,5-dialkyltetrahydro-1,2,5-thiadiazine-6-thione in which the alkyl groups each contain one to twenty carbon atoms.

9. Cured rubbery material of the class consisting of natural rubber and rubbery synthetic conjugated-diene polymers, cured with a compound of the formula

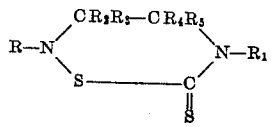

in which R and R₁ contain one to twenty carbon atoms and are from the class consisting of alkyl, alkenyl, cycloalkyl, benzyl, furfuryl, tetrahydrofurfuryl and terpenyl groups; and $R_2$, $R_3$, $R_4$ and $R_5$ are from the class consisting of hydrogen, alkyl, alkenyl, cycloalkyl, benzyl, furfuryl, tetrahydrofurfuryl and terpenyl groups, said groups containing no more than twenty carbon atoms.

10. Vulcanizate of rubbery material of the class consisting of natural rubber and rubbery synthetic conjugated-diene polymers, vulcanized with 2,5-dialkyltetrahydro-1,2,5-thiadiazine-6-thione.

11. Vulcanizate of natural rubber, vulcanized with 2,5-dialkyltetrahydro-1,2,5-thiadiazine-6-thione.

12. Vulcanizate of rubbery copolymer of styrene and 1,3-butadiene, vulcanized with 2,5-dialkyltetrahydro-1,2,5-thiadiazine-6-thione.

13. Vulcanizate of rubbery copolymer of conjugated-diene monomer and mono-unsaturated vinyl monomer, vulcanized with 2,5-dialkyltetrahydro-1,2,5-thiadiazine-6-thione.

JAMES A. SHOTTON.
ROBERT A. DONIA.

No references cited.